US008186948B2

(12) United States Patent
Kabatzke et al.

(10) Patent No.: US 8,186,948 B2
(45) Date of Patent: May 29, 2012

(54) WIND ENERGY PLANT WITH A CENTRAL CONTROL DEVICE AND A CONTROL UNIT IN THE ROTOR AND METHOD FOR THE OPERATION OF SUCH A WIND ENERGY PLANT

(75) Inventors: Wolfgang Kabatzke, Geesthacht (DE); Gerd Hose, Preetz (DE)

(73) Assignee: Nordex Energy GmbH, Norderstedt (DE)

( * ) Notice: Subject to any disclaimer, the term of this patent is extended or adjusted under 35 U.S.C. 154(b) by 617 days.

(21) Appl. No.: 12/366,312

(22) Filed: Feb. 5, 2009

(65) Prior Publication Data

US 2010/0124498 A1 May 20, 2010

(30) Foreign Application Priority Data

Nov. 19, 2008 (DE) .......................... 10 2008 057 934

(51) Int. Cl.
*B63H 3/00* (2006.01)
*F03D 11/00* (2006.01)

(52) U.S. Cl. ................ 416/1; 416/31; 416/61; 416/147; 290/44

(58) Field of Classification Search .................... 290/44; 416/1, 31, 61, 147
See application file for complete search history.

(56) References Cited

U.S. PATENT DOCUMENTS

| 7,909,575 | B2 * | 3/2011 | Barbu et al. ...................... 416/61 |
| 7,944,067 | B2 * | 5/2011 | Kammer et al. ................ 290/44 |
| 2006/0214428 | A1 * | 9/2006 | Altemark et al. ................ 290/44 |
| 2008/0118354 | A1 * | 5/2008 | Jeppesen et al. .................. 416/1 |
| 2009/0187282 | A1 * | 7/2009 | Menke et al. .................. 700/287 |
| 2009/0280012 | A1 * | 11/2009 | Caffrey .......................... 416/147 |
| 2010/0259045 | A1 * | 10/2010 | Vilbrrandt ........................ 290/44 |

FOREIGN PATENT DOCUMENTS

| DE | 20 2005 011 896 U1 | 4/2007 |
| DE | 601 21 483 T2 | 7/2007 |
| EP | 1500 230 A1 | 10/2003 |
| WO | 2009050157 A2 | 4/2009 |

* cited by examiner

*Primary Examiner* — Matthew W Such
(74) *Attorney, Agent, or Firm* — Vidas, Arrett & Steinkraus, P.A.

(57) ABSTRACT

A wind energy plant with a nacelle, a rotor, which features at least one rotor blade adjustable in its blade pitch angle, a central control device for controlling the wind energy plant and a control unit disposed in the rotor for controlling the blade pitch angle of the at least one rotor blade, wherein the central control device and the control unit in the rotor can exchange data with each other via a data link, which comprises at least one first sending and receiving device at the nacelle side and at least one second sending and receiving device at the rotor side, wherein a wireless network connection with a safety-oriented communication protocol is provided between the at least one first sending and receiving device and the at least one second sending and receiving device, and that one monitoring- and communication device at a time is associated to the first and/or the second sending and receiving device, which can monitor the function of the sending and receiving device and initiate a predetermined action in the case of an error.

27 Claims, 4 Drawing Sheets

WIND ENERGY PLANT WITH A CENTRAL CONTROL DEVICE AND A CONTROL UNIT IN THE ROTOR AND METHOD FOR THE OPERATION OF SUCH A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a wind energy plant with a nacelle, a rotor, which features at least one rotor blade adjustable in its blade pitch angle, a central control device for controlling the wind energy plant and a control unit disposed in the rotor for controlling the blade pitch angle of the rotor blade, wherein the central control device and the control unit in the rotor can exchange data with each other via a data link which comprises at least one first sending and receiving device at the nacelle side and at least one second sending and receiving device at the rotor side, and to a method for the operation of such a wind energy plant.

From the document DE 20 2005 011 896 U1, the entire contents of which is incorporated herein by reference, a wind energy plant is known in which the rotor contains a control unit with an adjustment device, which adjusts the blade pitch angle of the rotor blades. The control unit is connected to a receiving unit, via which it receives controls signals from a central control. The control unit comprises an incident module, which performs an incident rotor blade adjustment into the feathering position when it receives an incident signal, in order to set the wind energy plant into a safe condition. The central control and the control unit in the rotor are connected via an analog radio link. The emergency signal is transmitted via the radio link, wherein preferably the interruption of a continuously sent permanent signal indicates a breakdown of the radio link.

The wind energy plant according to the present invention has a rotor, which features at least one rotor blade adjustable in its blade pitch angle, a central control device for controlling the wind energy plant and a control unit disposed in the rotor for controlling the blade pitch angle of the rotor blade, wherein the central control device and the control unit in the rotor can exchange data with each other via a data link which comprises at least one first sending and receiving device at the nacelle side and at least one second sending and receiving device at the rotor side, and the data link features a wireless network connection with a safety-oriented communication protocol.

The rotor of the wind energy plant can have a horizontal axis, preferably there are three rotor blades. The central control device controls all the functions of the wind energy plant. It is often also realised as a central hardware system with a specialised software for the management of the operation. The control unit disposed in the rotor is preferably situated in the hub of the rotor. The adjustment device for each rotor blade comprises a drive, an electric motor preferably, which is triggered by a drive control unit. Optionally via a suitable gearbox, the drive acts on the rotor blade, which is mounted rotatably around its longitudinal axis in the hub.

In contrast to the analog radio link known from the state of the art, in the present invention a wireless network connection with a safety-oriented communication protocol is used for the wireless data link between the central control device and the control unit in the rotor. The use of a network connection permits the transmission of very large data amounts, through which more complex and in particular also faster control- and adjustment processes can be performed. The safety and reliability of the data transmission is considerably improved by the safety-oriented communication protocol. Safety-oriented means that the communication protocol comprises defined measures which prevent communication errors. Examples of such measures which ensure the errorless data exchange are the use of a modulation which is tolerant against disturbances, and of a purposeful reduction of the data rate in defined steps for maintaining the data link when the link is compromised by perturbing effects.

The frequency of the occurrence of emergency stops, which are triggered in the predominant number of breakdowns of the data link in conventional wind energy plants, can be significantly reduced by the high reliability of the wireless network connection. This has an immediate influence on the lifespan of the wind energy plant, because each emergency stop represents a lifespan-relevant load for the respective components.

The wireless network connection comprises a first sending and receiving device on or in the nacelle, and a second sending and receiving device on or in the rotor of the wind energy plant. Through this, a safety-oriented wireless network connection can be realised with a short radio link distance, even when the central control device is disposed on the foot of the tower, which improves the transmission safety.

The communication protocol can in particular satisfy the safety demands according to Safety Integrity Level 3 (SIL 3) of the norm IEC 61508 and/or comparable safety demands, and be correspondingly certified. For instance, comparable safety demands are defined by the norm EN 954-1 in category 4 and in the norm ISO 13849, which replaces this specification. By complying with these norms, the communication between the central control device and the control unit can satisfy the extreme safety demands known from the process- and manufacturing industry. This is particularly important for the safety-relevant blade adjustment. Suitable communication protocols feature amongst others a time monitoring (watch dog), an identifier between sender and receiver, for instance via unambiguous communication addresses, an optimised cyclic redundancy check (CRC) for the recognition of erroneous data bits of a telegram, an automatic error recognition and error forwarding via the network and an automatic recognition of restarting. Through this, all the error possibilities when transmitting messages like address distortion, loss, delay and so on can be counter-acted.

One monitoring- and communication device at a time is disposed on each one of the first and/or the second sending and receiving devices, which can monitor the regular function of the respective sending and receiving device and which can initiate a predetermined action in the case of an error. The predetermined action may be, for instance, the transmission of an error message, the presetting of a reduced power, the adjustment of a safety blade pitch angle or the starting of a hardware component. The monitoring- and communication devices may consist of components which satisfy the above mentioned safety requirements themselves according to the corresponding norms, and which are optionally certified. The monitoring- and communication devices check continuously whether the monitored sending and receiving devices function properly, i.e. in particular whether the field strength, the power supply, the condition of the antennas and the communication speed are within preset tolerance ranges. When one or more errors are detected due to a deviation, suitable counter-measures can be taken by the central control device or by a monitoring- and communication device itself, in particular an early enough switch-over to a redundant hardware component is possible, for instance to a second sending and receiving device.

In a very advantageous embodiment, the wireless network connection is a so-called Industrial Wireless Local Area Network (iWLAN) connection. In particular, this proprietary technology can guarantee a real-time capable transmission of the data by means of a technology which is known as Industrial Point Coordination Function (iPCF). In particular, the real-time capable communication can be guaranteed even in the case that mobile participants move in the radio hop. At the same time, the standards IEEE 802.11 are satisfied, i.e. the wireless network connection is compatible with standard WLAN-Nets.

In a very advantageous embodiment, one or more emergency shut-down push button switch(es) is/are disposed in the rotor, the actuation of which can be notified to the central control device via a network, wherein a component of the network is realised as a wireless network connection. Such shut-down push button switches are intended to permit an instantaneous shut-down of the wind energy plant in the emergency case. Extremely high demands are to be made on the reliability of their function. For this purpose, a separate electric connection from the rotor to the central control device is usually provided, which means a high expenditure. In the case that a sufficiently safe wireless network connection is provided for the communication between the central control device and the control unit in the rotor, like in the present invention, the same can also be used for the forwarding of the signal from the shut-down push button switch, so that the mentioned additional expenditure for the safety chain is not necessary.

In a very advantageous embodiment, the first and the second sending and receiving device are both provided in a redundant realisation. Through this redundant realisation of the sending and receiving devices, optionally inclusive of the associated antennas, the wireless network connection can be maintained even in a breakdown of a sending and receiving device.

According to one embodiment, the first sending and receiving device is connected to the central control device via a hard-wire network, wherein the hard-wire network can also be realised as an optical waveguide connection. In a further advantageous embodiment, the second sending and receiving device is connected to the control unit in the rotor via a hard-wire network, wherein even this hard-wire network can be realised as an optical waveguide connection. In particular, it is provided to use even these hard-wire networks in connection with a safety-oriented communication protocol. By doing so, the bandwidth of the wireless network connection on the one hand, and on the other hand also the high reliability and transmission safety across the complete data link between the central control device and the control unit in the rotor can be used to full capacity.

According to an advantageous embodiment, the two monitoring- and communication devices are connected with each other via an electric line featuring a slip ring, and are realised for the continuous exchange of status records via the electric line. The communication via a slip ring between nacelle and hub is known from conventional wind energy plants and is used there for the transmission of control commands, of a preset blade pitch angle for instance. In the present invention, this alternative data link via the slip ring is only used for the exchange of status messages between the two monitoring- and communication devices in the regular operation. In this way, immediately safety relevant information is not forwarded via the in principle incident-susceptible slip ring connection. By doing so, a communication possibility between the two monitoring- and communication devices which does not depend on the radio link is created on the one hand, on the other hand, this additional communication channel is permanently active, and can be used without delay also for data communication when the radio link breaks down ("hot standby").

In an advantageous embodiment, the electric line between the two monitoring- and communication devices is a bus system according to the master/slave-principle, wherein the monitoring- and communication device on or in the nacelle is the master and the monitoring- and communication device on or in the rotor is the slave. This permits an effective data communication, initiated by the monitoring- and communication device accommodated on or in the nacelle.

According to an advantageous embodiment, the blade adjustment device features a monitoring device, which can detect the real blade pitch angle continuously and can compare it with a desired value preset by the central control device. Thus, a separate monitoring device is provided, which can be made up of safety-oriented components, like the monitoring- and communication devices of the sending and receiving devices. The monitoring device is existing in addition to a control device for the blade pitch angle. The goal of the desired-real comparison, which is performed by the monitoring device, is not the regulation of the blade pitch angle itself, but to recognise errors of the regulating function which is performed by the central control device. An additional safety level is introduced into the blade adjustment system by the monitoring device for the blade adjustment device, which can safely prevent an adjustment of the blade pitch angle which is arbitrary and deviating from a control command.

The described monitoring device for the blade adjustment device can also be reasonably used in a manner which does not depend on the wireless network connection between the central control device and the control unit in the rotor. The monitoring of the blade adjustment device provides advantages for the operational safety of the wind energy plant even in connection with other known techniques of the communication between the central control device and the control unit.

In an advantageous embodiment, the monitoring device of the blade adjustment device features one or more separate sensors for the blade pitch angle, and/or for the current of an electric motor of the blade adjustment device and/or for the voltage of an electric motor of the blade adjustment device and/or for the rotational speed of an electric motor of the blade adjustment device, wherein the separate sensor or the separate sensors, respectively, are independent from the sensors analysed by the central control device. Thus, in this embodiment there is a detection of the real blade pitch angle independent from the input variables of the central control device. By doing so, the function of the blade adjustment device, including the associated sensors which are analysed by the central control device, can be reliably monitored.

In an advantageous embodiment, the monitoring device of the blade adjustment device is realised to continuously check the data captured by the separate sensor or the separate sensors, respectively, and the desired values and/or control commands transmitted by the central control device for plausibility, and to set the associated rotor blade into a safety position by adjusting the blade pitch angle in the case of deviations. In contrast to a conventional adjustment device for the blade pitch angle, which essentially performs a comparison of desired and real values, the monitoring device can be realised such that it can analyse complex relations between the measurement values and desired values and/or control commands. For instance, a control command, transmitted by the central control device, to move the rotor blades about a certain angle, can be set into a relation with the adjustment speed detected by the separate sensors and the electric measurement values of the motor which is used for the adjustment. Through this, for instance binds in a gearbox or other disturbances of the function of the adjustment device can be recognised. When the monitoring device detects a deviation which indicates a disturbance affecting the safety of the operation, it can set the associated rotor blade or all the rotor blades, respectively, into a safety position, into a feathering position for instance. Also conceivable and advantageous is a purposeful continuation of the operation in a range with a smaller load, by lowering the power for instance.

In an advantageous embodiment, a separate blade adjustment device each having one associated monitoring device at a time is provided for each rotor blade. This permits an even more accurate monitoring of the events in the blade adjustment.

According to an advantageous embodiment, the blade adjustment devices for each rotor blade are connected via a network which uses a safety-oriented communication protocol. Preferably used is a ring network. By doing so, an active communication between the monitoring devices in the hub is possible. In particular, a comparison and, as the case may be, a matching between the captured measurement data can be performed and a plausibility check extended to that effect can be performed.

In an advantageous embodiment, the sending and receiving device on or in the rotor features at least one antenna, which consists of a leaky waveguide and is disposed in the region of that side of the hub which faces the nacelle. Preferably, the leaky waveguide is a coaxial cable with small openings in the shield, a so-called RCoax-cable. In principle, arbitrary antennas can be used for the sending and receiving devices, suitable rod antennas for instance. However, the realisation with leaky waveguide permits a better tuning to the radio link and to the electromagnetic disturbance effects, which are inevitably strong in the region of the nacelle of a wind energy plant. Through the arrangement on that side of the hub which faces the nacelle, the radio link distance can be reduced to a minimum in its dimension.

According to an advantageous embodiment, the antenna is ring-shaped and disposed symmetrically to the rotor shaft. This arrangement has the effect that the conditions of the radio link are independent in a high degree from the rotational movement of the rotor. In particular, the distance between the antenna on the rotor and the further antenna disposed on or in the nacelle remains unaffected by the rotational movement.

Preferably, the antenna for the sending and receiving device on or in the rotor and/or on or in the nacelle is equipped with a separate lightning protection. This measure serves for the safety of operation.

In an advantageous embodiment, the sending and receiving device on or in the nacelle features at least one antenna, which consists of a leaky waveguide and is disposed near to the hub in the region of that side of the nacelle which faces the hub. This realisation serves to keep disturbance effects on the wireless network connection at minimum.

In an advantageous embodiment, the central control device and/or the control unit and/or the monitoring- and communication devices and/or the monitoring device and/or the network connections are realised as highly available and/or fail-safe. Highly available means in particular that two microprocessors or controls of the same type are used e.g., and that it can be switched over to a standby system in the case of an error. In this, switch-over times of less than 10 ms can actually be achieved, which permits a continuous operation of a wind energy plant. The internal operating system of such a highly available system provides that all those commands, whose execution would provoke different conditions in the two alternative systems, are carried out simultaneously with each other. Fail-safe means that an error cannot lead to accidents or damages. Fail safe systems must guarantee highest safety for humans, animals and the environment. Fail safe systems are often also designated as safety-oriented systems. A safety-oriented control monitors itself automatically, recognises errors by itself and passes over to a safe condition or remains in such a condition when an error occurs.

The method according to the present invention serves for the operation of a wind energy plant which features a nacelle, a rotor with at least one rotor blade adjustable in its blade pitch angle, a central control device, which controls the wind energy plant, and a control unit disposed in the rotor, which controls the blade pitch angle of the at least one rotor blade, wherein the central control device and the control unit in the rotor exchange data with each other via a data link which comprises at least one first sending and receiving device at the nacelle side and at least one second sending and receiving device at the rotor side, wherein the data are exchanged via a wireless network connection with a safety-oriented communication protocol, wherein one monitoring- and communication device at a time is associated to the first and/or the second sending and receiving device which monitors the function of the sending and receiving device and initiates a predetermined action in the case of an error. For the explanation of the method, it is made reference to the above details regarding the wind energy plant. In the following, it is amendatorily dwelled on some particularities of the claimed method.

The wireless network connection features a first sending and receiving device disposed on or in the nacelle, and a second sending and receiving device disposed on or in the rotor, which are each at a time associated to a monitoring- and communication device which can monitor the regular function of the associated sending and receiving device and transmit an error message, for instance, or initiate another action in the case of an error.

According to one embodiment, the two monitoring- and communication devices are connected with each other via an electric line featuring a slip ring via which they continuously exchange status records. According to an advantageous embodiment, in the case of a breakdown of the wireless network connection, the two monitoring- and communication devices do not only transmit status information but also control data via the electric connection.

In a further advantageous embodiment, the electric connection between the two monitoring- and communication devices is used for a controlled shut-down of the wind energy plant in the case of a longer and/or more severe breakdown of the wireless network connection. This means that the wind energy plant has not to be shut down at every breakdown of the data exchange via the wireless network connection. In the case that it is dealt with a breakdown classified as slight or which is very short, the operation of the wind energy plant can be made to continue through the transmission of control data via the electric connection between the two monitoring- and communication devices. In the case that it is dealt with a longer and/or classified as severe breakdown of the wireless network connection, it is also not necessary to perform an instantaneous emergency stop, instead, a controlled shut-down of the wind energy plant is still possible. This is an essential advantage with immediate positive effects on the lifespan of the wind energy plant.

BRIEF DESCRIPTION OF THE FIGURES OF THE DRAWINGS

In the following, the present invention is explained in more detail by means of an example of its realisation, represented in four figures.

DETAILED DESCRIPTION OF THE INVENTION

Figure 1:
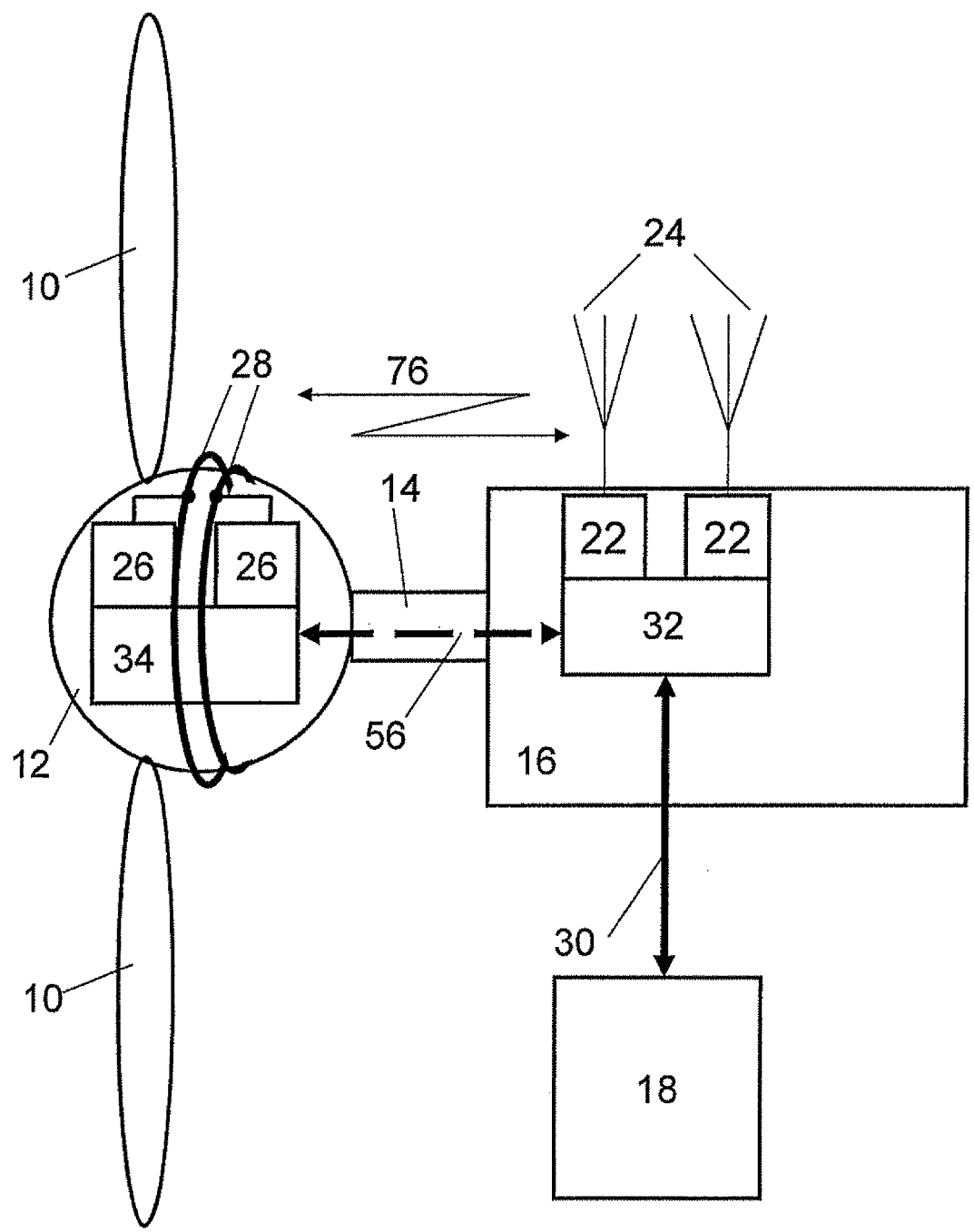
FIG. 1 shows nacelle, rotor and central control device of a wind energy plant according to the present invention in a strongly simplified schematic representation.

While this invention may be embodied in many different forms, there are described in detail herein a specific preferred embodiment of the invention. This description is an exemplification of the principles of the invention and is not intended to limit the invention to the particular embodiment illustrated The wind energy plant depicted in FIG. 1 has a rotor, consisting of a hub 12 and rotor blades 10, which are adjustable in their blade pitch angle. A rotor shaft 14 connects the rotor to a nacelle 16, which is mounted on the not shown tower of the wind energy plant and features, amongst others, a generator for the transformation of the wind energy taken up by the rotor into electric energy. A central control device 18 of the wind energy plant is located in the tower or in the nacelle. Via a hard-wire network 30, it is connected to a monitoring- and communication device 32, which is associated to two first sending and receiving devices 22 and monitors the regular function thereof, wherein the first sending and receiving devices 22 and the monitoring- and communication device 32 are disposed in the nacelle. Each sending and receiving device 22 features one antenna 24, which is mounted on the nacelle with mounting feet. The mounting feet are anchored in the antennas. Each antenna features a not shown lightning protection device.

In the hub 12 of the rotor are disposed two second sending and receiving devices 26, which are each one at a time connected to an antenna 28. The antennas 28 are preferably realised as ring antennas. Each ring antenna consists of so-called leaky waveguide, often also designated as a RCoax cable, which is disposed symmetrically to the rotor shaft 14 annularly around the hub 12 or the rotor shaft 14, respectively, on that side of the hub 12 which faces the nacelle 16. In this, the ring antennas preferably keep a distance to the hub or to other metal objects, respectively, of about 50 cm. Even these antennas feature a lightning protection device. The connection between the antennas 28 and the two second sending and receiving devices 26 takes place via one cable at a time, which is guided through the hub such that no water can penetrate into the hub. As an alternative to the ring antennas, three to four single antennas can be disposed close to that side of the hub 12 which faces the nacelle 16. A monitoring- and communication device 34 is associated even to the second sending and receiving devices 26.

As can be recognised from FIG. 1, the first sending and receiving devices 22 and the second sending and receiving devices 26, inclusive of the associated antennas 24 and 28, respectively, are realised redundantly.

The first sending and receiving devices 22 are connected to the second sending and receiving devices 26 via wireless network connection 76.

An electric connection 56 connects the monitoring- and communication device 32 in the nacelle 16 to the monitoring- and communication device 34 in the hub 12. This electric connection 56 features a slip ring.

Figure 2:
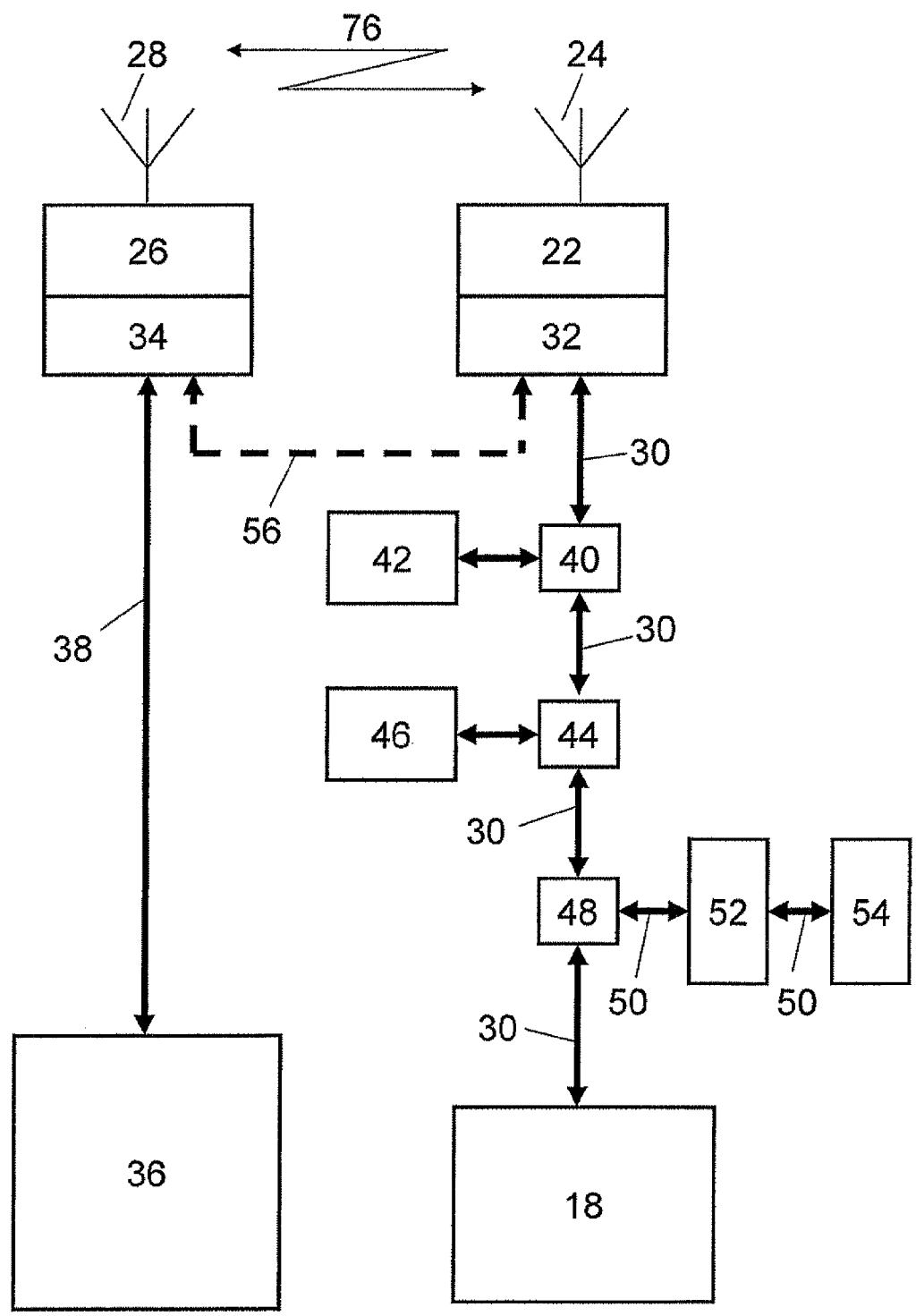
FIG. 2 shows a schematic block representation of selected components of a wind energy plant according to the present invention.

FIG. 2 shows further components of the system shown in FIG. 1. The monitoring- and communication device 34 is connected to the control unit 36 in the rotor of the wind energy plant, which is only adumbrated in FIG. 2, via a further hard-wire network 38.

The main converter 42 of the wind energy plant is connected to the hard-wire network 30 via a network coupler 40. Via a further network coupler 44, the hard-wire network 30 is connected to sensors 46, whose measurement values can thus be requested by the central control device 18 via the network 30. A further network coupler 48 serves for the connection of an additional network branch or of a bus system 50, via which standard input/output devices 52 and additional safety relevant input/output devices 54 are connected to the network connection 30. Amongst the safety relevant input/output devices 54 particularly rank an emergency shut-down push button switch and a vibration measurement device.

The central control device 18 is preferably realised fail-safe and/or highly available. Even the components of the monitoring- and communication device 32, 34 are preferably realised fail-safe and/or highly available.

Figure 3:
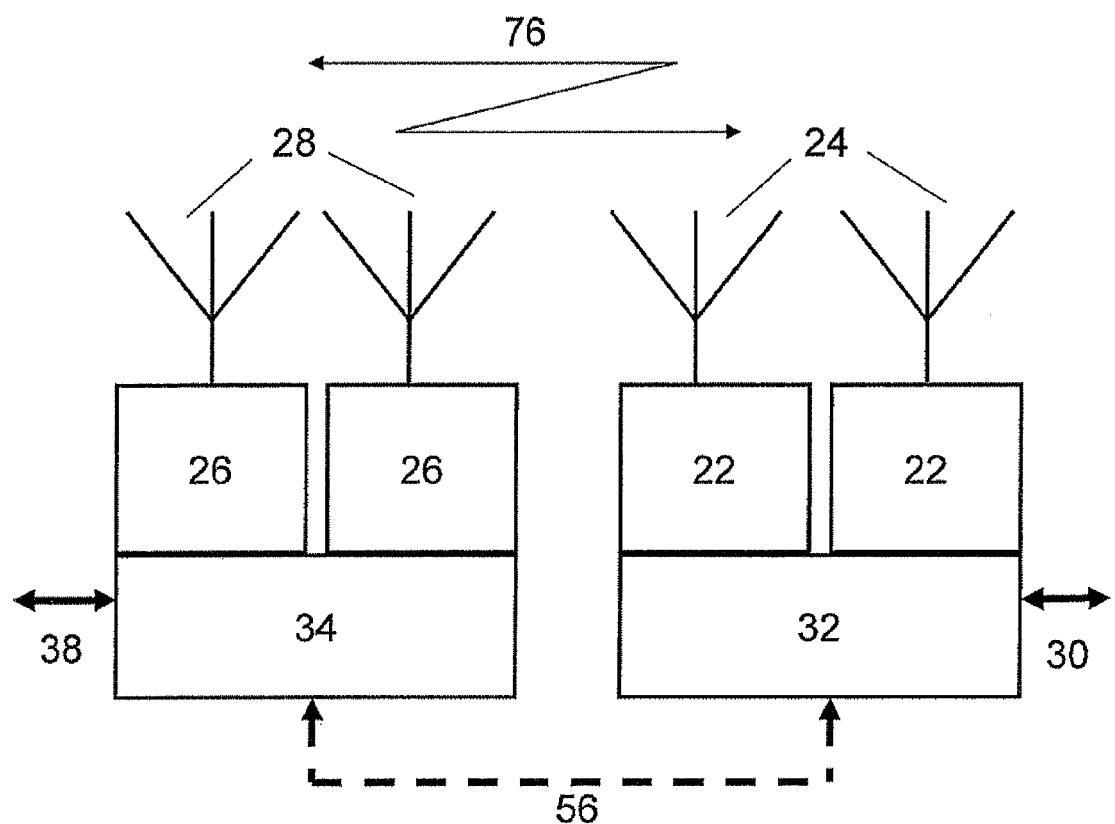
FIG. 3 shows details of the wireless network connection in a strongly simplified schematic representation.

The communication between the first sending and receiving devices 22 and the second sending and receiving devices 26 is depicted in FIG. 3 again. It is easy to recognise the redundant design of the sending and receiving devices 22 and 26, respectively, inclusive of the associated antennas. One monitoring- and communication device 32 or 34, respectively, is associated to each pair of sending and receiving devices 22 and 26, respectively. Between the two monitoring- and communication devices 32 and 34 there is an electric connection 56 as an alternative to the wireless network connection 76, which features a slip ring and is used for the permanent exchange of status information with a low data rate in the "hot standby" operation. With respect to this electric connection 56, the monitoring- and communication device 32 associated to the first sending and receiving devices 22 is realised as a master, the monitoring- and communication device 34 associated to the second sending and receiving devices 26 as a slave. In a breakdown of the wireless network connection 76, the data necessary for the operation of the wind energy plant can be transmitted via the electric connection 56. However, this mode of operation is maintained only for a predetermined, short period of time. In case that the wireless network connection 76 is not restored after the decay of this period of time, the wind energy plant is shut down by the central control device 18 via the electric connection 56. Even in this case of a severe and/or permanent breakdown of the wireless network connection 76, a sudden emergency stop of the wind energy plant can be avoided.

The monitoring- and communication device 32 is connected to the central control device 18 via the hard wire network 30. The monitoring- and communication device 34 is connected to the control unit 36 via the hard wire network 38.

Figure 4:
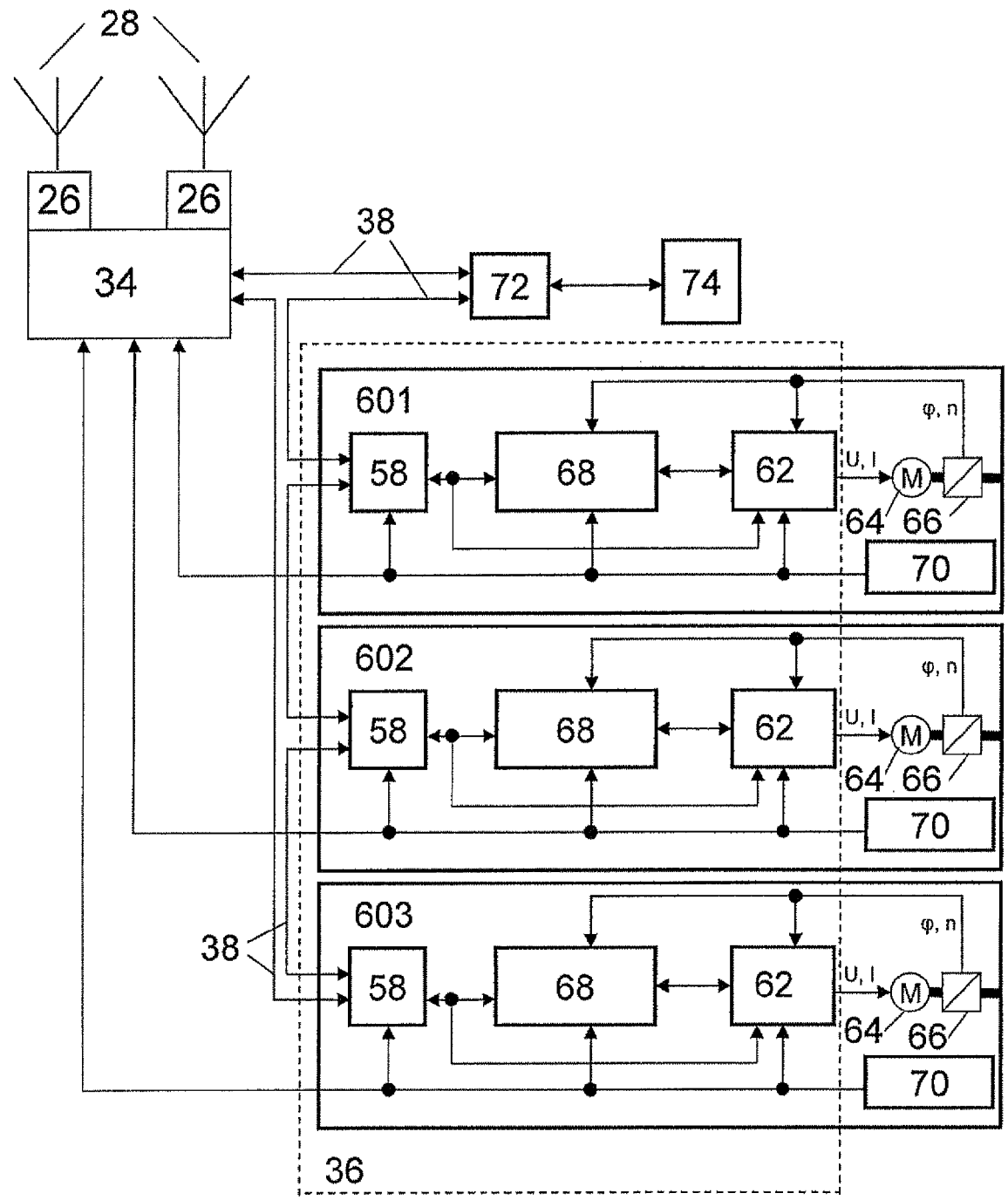
FIG. 4 shows details of the control unit in the rotor of the wind energy plant according to the present invention in a strongly simplified schematic block representation.

The latter is also depicted in FIG. 4, in which the second sending and receiving devices 26 are shown on the left side. The hard wire network 38 is realised annularly and connects the monitoring- and communication device 34 via three network couplers 58 to three blade adjustment devices 601, 602, 603, which are each at a time associated to a not shown rotor blade.

Each blade adjustment device 601, 602, 603 comprises a drive control unit 62 for controlling an electric motor 64, which can adjust the rotor blade, as the case may be via a suitable gearbox. Each blade adjustment device 601, 602, 603 features further a monitoring device 68, which monitors the regular function of the blade adjustment device. A sensor unit 66 is connected to the shaft of the electric motor 64. The position and/or rotational speed detected by the sensor unit 66 is reported back to the drive control unit 62 and to the monitoring device 68. The drive control unit 62, the monitoring device 68 and all the other components of the blade adjustment devices 601, 602, 603, as well as the monitoring- and communication device 34 are supplied with electric energy by an energy store 70 which exists separately for each individual blade adjustment device 601, 602, 603.

The hard wire network 38 is coupled to safety relevant input/output devices 74 via a further network coupler 72, in particular to an emergency shut-down push button switch and a vibration transmitter.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant comprising
a nacelle (16),
a rotor, which has at least one rotor blade (10) having an adjustable blade pitch angle,
a central control device (18) for controlling the wind energy plant and a control unit (36) disposed in the rotor for controlling the blade pitch angle of the at least one rotor blade (10), wherein the central control device (18) and the control unit (36) in the rotor can exchange data with each other via a data link, which comprises at least one first sending and receiving device (22) at the nacelle and at least one second sending and receiving device (26) at the rotor, wherein a wireless network connection (76) with a safety-oriented communication protocol is provided between the at least one first sending and receiving device (22) and the at least one second sending and receiving device (26), wherein a first monitoring- and communication device (32) is associated to the at least one first sending and receiving device (22), and can monitor a function of the at least one first sending and receiving device (22) and initiate a predetermined action in the case of an error, wherein a second monitoring- and communication device (34) is associated to the at least one second sending and receiving device (26) and can monitor a function of the at least one second sending and receiving device (26) and initiate a predetermined action in case of an error, wherein at least one emergency shut-down push button switch (74) is disposed in the rotor, the actuation of which can be notified to the central control device (18) via a network, wherein the wireless network connection (76) represents a component of the network.

2. The wind energy plant according to claim 1, wherein the wireless network connection (76) is an Industrial Wireless Local Area Network (iWLAN) connection.

3. The wind energy plant according to claim 1, wherein the first and the second sending and receiving device (22, 26) are both provided in a redundant realisation.

4. The wind energy plant according to claim 1, wherein the first monitoring- and communication device (32) associated to the first sending and receiving device (22) is connected to the central control device (18) via a hard-wire network (30).

5. The wind energy plant according to claim 1, wherein the second monitoring- and communication device (34) associated to the second sending and receiving device (26) is connected to the control unit (36) in the rotor via a hard-wire network (38).

6. The wind energy plant according to claim 1, wherein the first monitoring- and communication device (32) is connected to the second monitoring- and communication device (34) via an electric connection (56) comprising a slip ring for a continuous exchange of status records via the electric connection (56).

7. The wind energy plant according to claim 6, wherein the electric connection (56) between the first and second monitoring- and communication devices (32, 34) is a bus system according to a master/slave-principle, wherein the first monitoring- and communication device (32) is a master and the second monitoring- and communication device (34) is a slave.

8. The wind energy plant according to claim 1, wherein the control unit (36) comprises at least one blade adjustment device (601, 602, 603) to which a monitoring device (68) is associated which can detect a real blade pitch angle continuously and compare the real blade pitch angle with a desired value preset by the central control device (18).

9. The wind energy plant according to claim 8, wherein the monitoring device (68) associated to the blade adjustment device (601, 602, 603) comprises one or more separate sensors for the real blade pitch angle, and/or for a current of an electric motor (64) of the blade adjustment device (601, 602, 603) and/or for a voltage of an electric motor (64) of the blade adjustment device (601, 602, 603) and/or for a rotational speed of an electric motor (64) of the blade adjustment device (601, 602, 603), wherein the separate sensor or the separate sensors, respectively, are independent from sensors analyzed by the central control device (18).

10. The wind energy plant according to claim 8, wherein the monitoring device (68) associated to the blade adjustment device (601, 602, 603) is realized to continuously check data captured by the separate sensor or the separate sensors, respectively, and desired values and/or control commands transmitted by the central control device (18) for plausibility, and to set an associated rotor blade (10) into a safety position by adjusting the blade pitch angle in the case of deviations.

11. The wind energy plant according to claim 8, wherein for each rotor blade (10), there is provided a separate blade adjustment device (601, 602, 603) having an associated monitoring device (68).

12. The wind energy plant according to claim 11, wherein the blade adjustment devices (601, 602, 603) for each rotor blade (10) are connected via a network (38) which uses a safety-oriented communication protocol.

13. The wind energy plant according to claim 1, wherein the second sending and receiving device (26) at the rotor comprises at least one antenna (28), which consists of a leaky waveguide and is disposed in a region of a hub (12) facing the nacelle (16).

14. The wind energy plant according to claim 13, wherein the antenna (28) is ring-shaped and disposed symmetrically to a rotor shaft (14).

15. The wind energy plant according to claim 13, wherein the antenna (24) associated to the first sending and receiving device (22) and/or the antenna (28) associated to the second sending and receiving device (26) is equipped with a separate lightning protection.

16. The wind energy plant according to claim 1, wherein the first sending and receiving device (22) comprises at least one antenna (24), which consists of a leaky waveguide and is disposed near to a hub (12) in a region of the nacelle (16) facing the hub (12).

17. The wind energy plant according to claim 1, wherein the central control device (18) and/or the control unit (36) and/or the first monitoring- and communication device (32) and/or the second monitoring- and communication device (34) and/or the monitoring device (68) and/or the hard wire network (30, 38) and/or the wireless network connections (30, 38, 76) are realized as highly available and/or fail-safe.

18. A method for operation of a wind energy plant comprising the steps of:
providing a nacelle,
providing a rotor which has at least one rotor blade (10) having an adjustable blade pitch angle, a central control device (18) which controls the wind energy plant, and a control unit (36) disposed in the rotor for controlling the blade pitch angle of the at least one rotor blade (10), further comprising the steps of:
exchanging data between the central control device (18) and the control unit (36) in the rotor via a data link which comprises at least one first sending and receiving device (22) and at least one second sending and receiving device (26) at the rotor, wherein the data are exchanged via a wireless network connection (76) with a safety-oriented communication protocol,
monitoring a function of the at least one first sending and receiving device (22) with a first monitoring- and communication device (32) associated to the at least one first sending and receiving device (22), wherein the first monitoring- and communication device (32) initiates a predetermined action in case of an error,
monitoring a function of the at least one second sending and receiving device (26) with a second monitoring- and communication device (34) associated to the at least one second sending and receiving device (26), wherein the second monitoring- and communication device (34) initiates a predetermined action in case of an error, and
at least one emergency shut-down push button switch (74) disposed in the rotor is actuated and notifies the central control device (18) via a network, wherein the wireless network connection (76) represents a component of the network.

19. The method according to claim 18, wherein the first and second monitoring- and communication devices (32, 34) are connected with each other via an electric connection (56) comprising a slip ring and continuously exchange status records via the electrical connection (56).

20. The method according to claim 19, wherein in case of a breakdown of the wireless network connection (76), the first and second monitoring- and communication devices (32, 34) do not only transmit status information but also control data via the electric connection (56).

21. The method according to claim 19, wherein in case of a longer and/or more severe breakdown of the wireless network connection (76), the electric connection (56) is used for a controlled shut-down of the wind energy plant.

22. The method according to claim 18, wherein for each rotor blade, there is provided a separate blade adjustment device (601, 602, 603) having an associated monitoring device (68), which continuously detects a real blade pitch angle and compares the real blade pitch angle with a desired value transmitted by the central control device (18).

23. The method according to claim 22, wherein in case of a deviation between desired values and/or control commands transmitted by the central control device (18) and the real blade pitch angle captured by the associated monitoring device (68), a blade adjustment device sets a rotor blade (10) into a safety position by adjusting a blade pitch angle.

24. The method according to claim 22, wherein one of the monitoring devices (68) associated to one of the blade adjustment devices (601, 602, 603) continuously captures data mentioned below with one or more separate sensors for the blade pitch angle, and/or for a current of an electric motor (64) of the blade adjustment device (601, 602, 603) and/or for a voltage of an electric motor (64) of the blade adjustment device (601, 602, 603) and/or for a rotational speed of an electric motor (64) of the blade adjustment device (601, 602, 603), wherein the separate sensor or the separate sensors, respectively, work independently from sensors analyzed by the central control device (18).

25. The method according to claim 24, wherein one of the monitoring devices (68) associated to one of the blade adjustment devices (601, 602, 603) continuously checks data captured by the separate sensor or the separate sensors, respectively, and desired values and/or control commands transmitted by the central control device (18) for plausibility, and sets the associated rotor blade (10) into a safety position by adjusting the blade pitch angle in the case of deviations.

26. The method according to claim 22, wherein the associated monitoring devices (68) are connected via a network (38) and exchange data with the aid of a safety-oriented communication protocol.

27. The method according to claim 26, wherein at least one of the associated monitoring devices (68) or an additional monitoring device compares data detected for individual rotor blades (10) with each other and performs a plausibility check.

* * * * *